(12) United States Patent
Hartmann et al.

(10) Patent No.: US 6,389,089 B1
(45) Date of Patent: May 14, 2002

(54) METHOD OF SEARCHING FOR PILOT SIGNALS

(75) Inventors: Ralf Hartmann; Bin Yang, both of München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/539,239

(22) Filed: Mar. 30, 2000

Related U.S. Application Data

(63) Continuation of application No. PCT/DE98/02777, filed on Sep. 18, 1998.

(51) Int. Cl.⁷ .............................. H04L 7/06
(52) U.S. Cl. ................................... 375/364
(58) Field of Search .................. 375/342, 362, 375/364, 365, 368, 371, 373; 370/503, 509, 510, 511, 512, 514, 516, 520

(56) References Cited

U.S. PATENT DOCUMENTS

| | | |
|---|---|---|
| 4,896,336 A | 1/1990 | Henley et al. |
| 5,151,926 A | 9/1992 | Chennakeshu et al. |
| 5,390,216 A | 2/1995 | Bilitza et al. |
| 5,588,027 A * | 12/1996 | Lim ........................ 375/330 |
| 5,828,705 A * | 10/1998 | Kroeger et al. ............ 375/326 |
| 6,104,767 A * | 8/2000 | Atarius et al. ............ 375/344 |

FOREIGN PATENT DOCUMENTS

| | | |
|---|---|---|
| EP | 0 387 720 | 9/1990 |
| EP | 0 546 614 A1 | 6/1993 |

OTHER PUBLICATIONS

"Synchronization einer Mobilstation im GMS–System DMCS 900 (D–Netz)", (Neuner et al.), dated 1993, Frequenz 47, pp. 66–72, pertains to the synchronization of a mobile station in the GMS–system DMCS 900 (D–net), as mentioned on p. 4 of the specification.

"Digitaler Demodulator für den mobilen Satellitenfunk" (Alberty et al.), dated Nov. 1988, ANT Nachrichtentechnische Berichte, No. 5,Backnang, DE, pp. 83–92, pertains to a digital demodulator for the mobile satellite radio.

* cited by examiner

*Primary Examiner*—Don N. Vo
(74) *Attorney, Agent, or Firm*—Laurence A. Greenberg; Werner H. Stemer; Gregory L. Mayback

(57) ABSTRACT

A pulse train with known values and a known length contained in a signal is identified. The mathematical sign of the phase difference between successive samples of the signal is used to assess whether the transmitted pulse is a 1 or a 0, and with the sum of the pulses being determined in a window which is proportional to the length of the pulse train. The pulse train is considered as being identified at the time when the sum of the pulses in the search window exceeds a given threshold value.

5 Claims, 1 Drawing Sheet

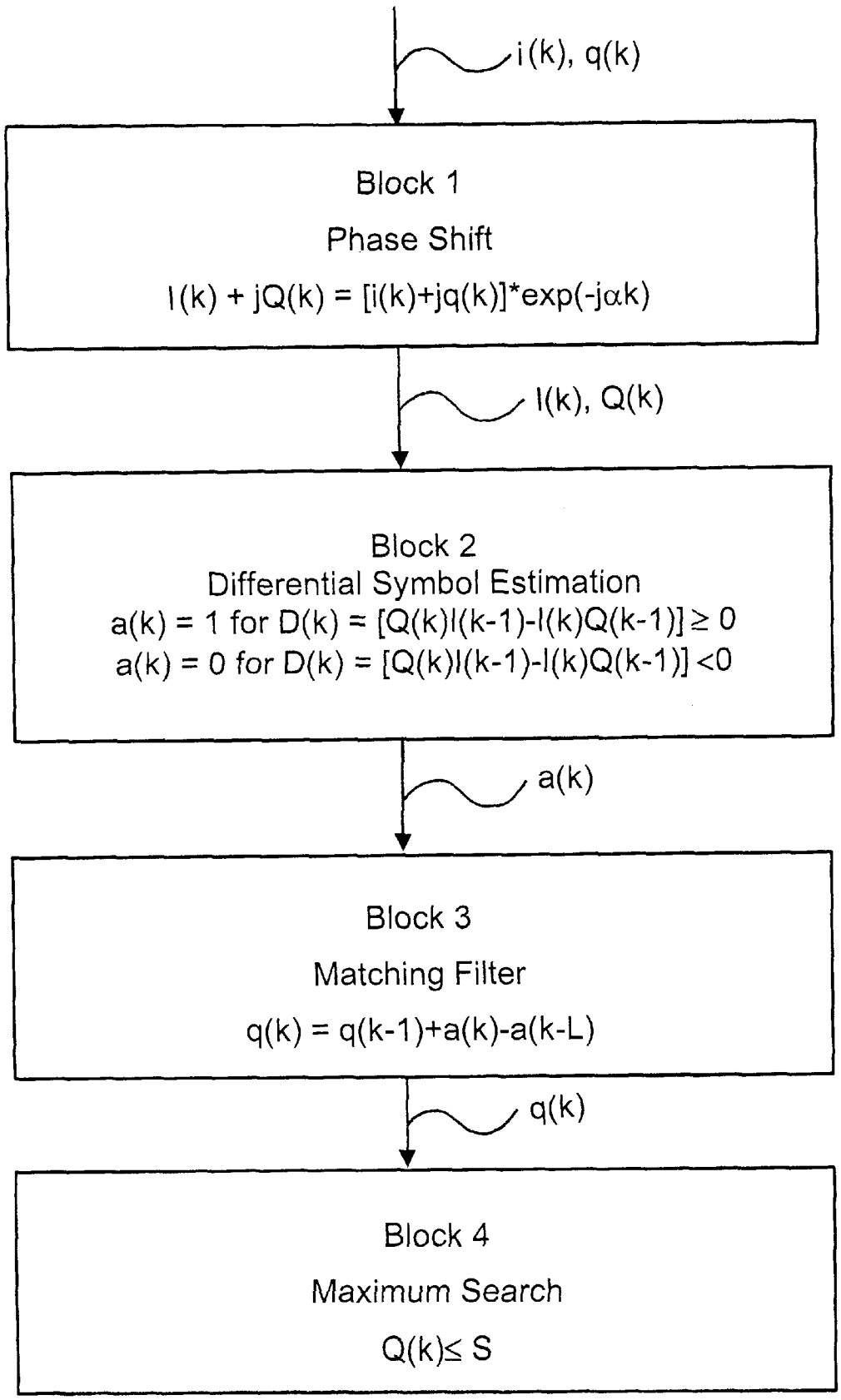

METHOD OF SEARCHING FOR PILOT SIGNALS

CROSS-REFERENCE TO RELATED APPLICATION

This is a continuation of copending International Application PCT/DE98/02777, filed Sep. 18, 1998, which designated the United States.

BACKGROUND OF THE INVENTION

Field of the Invention

The invention lies in the signal processing field. More specifically, the invention relates in general to a method for searching for pilot tones. These are sinusoidal oscillations at a known frequency in any given signal.

In communications systems, in particular in mobile radio systems, it is frequently necessary to search for pilot tones. For example, in digital mobile radio systems which operate in accordance with the GSM/DCS1800/PCS1900 Standard, the radio traffic is organized using organization channels. A mobile station which wishes to set up a connection to the network via a fixed station must firstly detect and search for the organization channel. This is done by searching for defined pulse trains. In the system mentioned above, so-called frequency correction bursts (FCB) are used for this purpose. Frequency correction bursts are a pulse train of 148 zeros.

In the system under consideration here, the so-called GMSK (Gaussian Minimum Shift Keying) method is used for transmission. In this case, a carrier frequency FT (for example 900 MHz) is modulated with the signal to be transmitted, that is to say in this case with the FCB signal of specific interest as well. The resultant frequency is FT+67.71 kHz, that is to say 67.71 kHz above the carrier frequency. The FCB pulse train of 148 zeros is in consequence changed into a pure sinusoidal signal. In baseband, this means that the phase difference between adjacent samples is ideally (without channel distortion and noise) 90°, if it is assumed that sampling takes place in time with the bits (270.83 kHz).

Various FCB search methods are known from the prior art. For example, the article "Anfangssynchronisation der Mobilstation im D-Netz" [Initial synchronization of mobile stations in the D network] by Frank and Koch, PKI Tech Report 1 (1990), pages 43–49 describes an FCB search method. There, the FCB search starts with a frequency shift by multiplying all the (I,Q) samples of the received signal by $\exp(-jk\pi/2)$. Each sample Z at the time k can be represented, in the complex plane as $Z(k)=I(k)+jQ(k)$. This means that the received signal is shifted downward by 67.71 kHz, so that its mid-frequency after frequency shifting is 0 Hz. After this, the signal is low-pass filtered. If this is the FCB signal, this signal passes through the filter; other signals, in contrast, are largely supressed owing to their wide bandwidth. The magnitude of the filtered signal is then formed which, ideally, results in a pulse similar to a rectangle, with the duration of an FCB. On the other hand, the signal for the rest of the time is like noise, owing to the modulation with random data bits. An optimum search filter can be specified for a pulse similar to a rectangle. This corresponds to sliding averaging for the duration of an FCB. An FCB is regarded as having been found if the maximum value of the filtered signal exceeds a previously defined threshold. The position of the maximum value marks the end of the detected FCB.

The method described in that prior art approach has the disadvantage that the maximum value of the filtered signal depends on the instantaneous signal amplitudes, and is therefore subject to severe fading fluctuations. Adaptive amplitude control is thus necessary for a reliable FCB search. Furthermore, the low-pass filter must have a high Q-factor, and its implementation is therefore complex. In addition, the method is very sensitive to frequency mistuning between the mobile station and base station. Thus, in practice, the maximum value must be averaged over several observation intervals.

A further method is described in the article "Synchronisation einer Mobilstation im GSM-System DMCS 900 (D-Netz)" [Synchronization of a mobile station in the DMCS 900 GSM system (D network)] by Neuner, Bilitza, and Gärtner in Frequenz [Frequency] 47 (1993)3–4, pages 66–72. In that prior art method, the phase difference between every fourth sample of the received signal is evaluated. The method is based on the observation that such phase differences are ideally zero for the duration of an FCB. Since the phase difference between two adjacent samples is 90 degrees, the phase difference between four samples is 4×90= 360 degrees, or zero degrees. Disturbances (fading) are taken into account by means of a validity area which is recalculated for each phase difference. An FCB is regarded as having been found when a sufficiently large number of negligibly small phase differences are present.

With that method, there are problems in determining the position of the FCB, since only every fourth sample is evaluated. Since the method described here makes it necessary to determine the phase difference between samples the arctan function must be used in order to calculate the phase of the sample from the quadrature components of the sampled received signal. However virtually no signal processors provide hardware support for this, so that the calculation is approximated by means of a complex series, which correspondingly requires computation time.

A third prior art method, which is described in European published patent specification EP 0 387 720, is similar to the above-mentioned method described by Frank and Koch. Two frequency-selective comb filters are used, one of which filter passes FCB signals at a frequency of 67.71 kHz without any impediment, while the other filter completely blocks FCB signals. Magnitudes and then sliding averages are formed from both filtered signals. The quotient of the two averages is then formed, and compared with a previously defined threshold value. If the quotient is below the threshold value, then an FCB is regarded as having been found. The position of the minimum of the quotient marks the end of the FCB.

The latter method has already been successfully used in chip sets for GSM mobile telephones. Since the quotient formation results in insensitivity to amplitude fluctuations, there is no need for the amplitude control that is required in the Frank and Koch method. However, the division required for quotient formation for this purpose likewise still involves a relatively large amount of computation time. Furthermore, the method is sensitive to frequency mistuning. If the frequency is mistuned, the one filter no longer passes the signal through completely, and the other filter no longer blocks the signal completely. This means that the minimum value of the quotient rises considerably and the threshold value, which is designed for the ideal case of minimal frequency mistuning, is no longer appropriate. The entire FCB search thus becomes uncertain.

German published patent disclosure DE 43 28 584 describes a circuit for synchronization of an electronic angle position transmitter. The angle position transmitter is continuously synchronized to the change in the angular position of a rotor. German published patent disclosure DE 38 06 428 describes a method for determining a bit combination contained in a serial bit stream. A search cycle is used to compare the bit combination successively with bits from comparison bit combinations. The comparison is carried out at the possible phase angles. European published patent disclosure EP 0 228 771 describes a full-duplex data transmission system for subscriber loops. The receiver in this case has a pilot phase detector which determines the phase of the incoming pilot tone. The phase detector does this with respect to a local pilot phase reference. Further, European published patent disclosure EP 0 489 880 discloses a diversity combination method, which relates to RF radio information connection systems. There, pilot symbol samples are separated from information symbol samples in the received, sampled and demodulated signal. The pilot symbol samples are then processed at predetermined pilot sampling times, in order to determine estimated values of a channel gain.

SUMMARY OF THE INVENTION

It is accordingly an object of the invention to provide a search method for pilot sequences in a signal, which overcomes the above-mentioned disadvantages of the heretofore-known devices and FCB search methods of this general type and which alleviates the problems associated with the sensitivity to fading disturbances or frequency discrepancies, and which furthermore can be implemented easily and requires only a short computation time.

With the foregoing and other objects in view there is provided, in accordance with the invention, a method of identifying a pulse train with known values and a known length in a signal, which comprises the following steps:

taking successive samples of a signal and determining whether a phase difference between successive samples of the signal is in a range $[0, \pi)$ representing a transmitted symbol "1" or in a range $[-\pi, 0)$ representing a transmitted symbol "0";

filtering the symbols estimated in the determining step by placing a search window over the successively estimated symbols, the search window having a length equal to a length of a pulse train to be identified minus one, and forming a symbol sum of the estimated symbols within each search window;

comparing the symbol sum with a sum threshold value; and if the symbol sum is greater than or equal to the sum threshold value, indicating a presence of the pulse train in the signal and a temporal position of the pulse train.

In accordance with an added feature of the invention, the successive samples of the signal are phase-shifted through an angle prior to the above determining step. The preferred phase-shift angle is $-22.5°$.

In accordance with an additional feature of the invention, the pulse train to be identified is a train of 148 zeros identifying an organization channel in a mobile radio system.

In accordance with a concomitant feature of the invention, the temporal position of the pulse train is defined as a time between an instant at which the symbol sum exceeds the sum threshold value for a first time, and an instant at which the symbol sum exceeds the threshold value for a last time.

In other words, the above objects of the invention are satisfied on the fact that the novel method uses the idea of differential symbol assessment or symbol estimation. The exact phase differences between successive (I,Q) samples of the received signal are not determined, as in the case of the above-mentioned method proposed by Neuner, Bilitza and Gärtner. Instead, the novel method attempts to determine whether the phase differences between successive samples are in the interval $[0, \pi)$ or $[-\pi, 0)$. The two cases correspond to a transmitted symbol of 1 ("+1") or 0 ("-1"), respectively, from the GMSK modulator. Since an FCB consisting of 148 zeros is changed after differential coding at the transmitter end to 147 ones, and there are virtually equal numbers of ones and zeros outside the FCB, it is thus possible to search for an FCB by searching for a long, cohesive block of ones.

The method according to the invention will be described in detail in the following text. Each sample Z of the signal received at the time k can in this case be described, in complex form, as $Z(k)=I(k)+jQ(k)$. In this case, $I(k)$ is assumed to be the in-phase component of the baseband sample at the time k, $Q(k)$ is assumed to be the quadrature component of the baseband sample at the time k. In the differential symbol assessment according to the invention, the samples at the time k and at the preceding time k−1 are used, by multiplication, to form the difference value $D(k)$ in accordance with the following formula:

$$D(k)=Q(k)*I(k-1)-I(k)*Q(k-1).$$

If $D(k) \geq 0$, then the one is present (the symbol $a(k)=1$). Otherwise, a zero (the symbol $a(k)=0$) is present. This means that the mathematical sign of $D(k)$ exactly reflects the transmitted symbol $a(k)$ in an ideal situation.

Fading disturbances can thereby occasionally lead to incorrect symbol estimation. For this reason, the estimated symbols (1 or 0) are filtered using a matching filter. This means placing a search window of length L=147 over the assessed symbols. The number of ones within the search window are in this case counted in a form of sliding addition process. The formula may be expressed as follows:

$$q(k)=q(k-1)+a(k)-a(k-L)$$

where $q(k)$ is the symbol sum, $a(k)$ the symbol assessed above and L the length of the search window. L is normally 147, since two samples are always used to calculate $D(k)$ and $a(k)$, and only 147 values of the difference value $D(k)$ are thus calculated for 148 samples. As has already been indicated above, the FCB consists of 147 ones after differential coding at the transmission end, but has a guard area of 8.25 bits each (guard bits) at both ends. The value of these guard bits is always one. Depending on the requirement, the transmission power is maintained unchanged or else is reduced (power ramping) during the time of the guard bits. If it is known that the transmission power will also be maintained during the transmission of the guard bits, then these additional guard bits may also be used for determination of the FCB. In this case, the search window would then have a length of L=148+16−1=163. However, if the transmission power is reduced during the guard bits, then only noise is received during the time of the guard bits. The guard bits may thus not then be used for FCB determination. A window with a length L=147 must then be used.

In any case, the symbol sum $q(k)$ is then compared with a threshold value S, and the presence of an FCB is deduced if the threshold value is exceeded.

The symbol sum $q(k)$ (i.e., the number of ones in a search window of length L) may assume only integer values between 0 and L. Owing to this coarse quantization, the symbol sum often assumes a maximum value more than once at successive times. Thus, in order to determine the position of the FCB, it is always important to search for the "middle maximum". A search for the first maximum that occurs (on the left) or the last maximum that occurs (on the right) would lead to systematic errors in one direction. The time at which the middle maximum occurs is determined by first of all fixing the time at which the symbol sum q(k) exceeds the threshold value S for the first time, and then fixing the time at which the symbol sum q(k) exceeds the threshold value S for the last time. The "middle maximum" then occurs at a time between these two values.

The accuracy of the search for the FCB is greatest when only ones are estimated within an FCB, and only zeros are estimated outside the FCB. In this case, the matching filter produces a pronounced maximum at the end of the FCB. In practice, owing to the modulation with random data bits outside the FCB, virtually equal numbers of ones and zeros are estimated. In order to improve the accuracy of the search for the FCB, it is thus advantageous to shift the phase difference between adjacent samples through a certain angle $(-\alpha)$ to the rear. If the angle $\alpha$ is in this case not chosen to be sufficiently large ($0<\alpha<<90°$) the differential symbol estimation according to the invention nevertheless still gives the desired ones within an FOB since, for an angle $\alpha$ it is not chosen to be too large ($90°-\alpha>>0$). However, outside an FCB, there is a tendency to assess more zeros than ones. It must, of course, be remembered that the angle $\alpha$ must not be too close to 90° since, otherwise, symbols within the FCB, that is to say the ones, are incorrectly assessed as zeros by the angle shift in conjunction with the other disturbances. It is recommended that the value for $\alpha$ be chosen such that it corresponds to an integer divisor of 90°, so that the same calculation table can be used for the internal complex calculations, in which cos $(k\alpha)$ and sin $(k\alpha)$ must be calculated. Investigations in which different signal disturbances have been considered have shown that an advantageous value for $\alpha$ is $\alpha=90°/4=22.5°$.

At the same time, the phase shift results in an increase in the robustness of the method with regard to frequency mistuning. Without such a phase shift, the FCB search is considerably more difficult with positive frequency mistuning than with negative frequency mistuning, since more ones than zeros are estimated outside the FCB. The phase shift through the preferred angle $\alpha$ results in a deliberate frequency shift, and thus moves the "search point" of the FCB search to a more advantageous area. If, for example, $\alpha$ is chosen to be $=22.5°$, then this results in a deliberate frequency shift of $-67.71/4=-17$ kHz.

Other features which are considered as characteristic for the invention are set forth in the appended claims.

Although the invention is illustrated and described herein as implemented in a pilot signal search method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole FIGURE of the drawing is a flow chart block diagram illustrating the system according to the invention.

DETAILED DESCRIPTION OF AN EXEMPLARY EMBODIMENT

Referring now to the figure of the drawing in detail, there is seen a block 1, representing a mixer. There, the samples i(k), q(k) of the baseband signal to be investigated which arrive at the times k are phase-shifted through an angle $\alpha$. This results in phase-shifted samples I(k), Q(k). This phase shift can be represented in complex form as follows:

$$I(k)+jQ(k)=[i(k)+jq(k)]*\exp(-j\alpha k).$$

The phase-shifted samples I(k) and Q(k) are now subjected to the actual differential symbol assessment in a block 2. This determines whether the phase differences between successive I,Q samples in time are in the interval $[0, \pi)$, which corresponds to the transmitted symbol "1", or in the interval $[-\pi, 0)$, which corresponds to the transmitted symbol "0". This differential symbol estimation, in which the mathematical sign of the phase difference is calculated for each time k, can be expressed in complex form as follows:

$$a(k)=1 \text{ for } D(k)=[Q(k)I(k-1)-I(k)Q(k-1)]\geq 0$$

$$a(k)=0 \text{ for } D(k)=[Q(k)I(k-1)-I(k)Q(k-1)]<0$$

The value a(k) is now subjected to match filtering in a block 3. There, the symbol sum q(k) is formed from the sum of the values in a window of length L in the form of a sliding addition process, as has already been described in detail above.

The symbol sum q(k) is now compared, in a block 4, with a threshold value S, in order to assess whether an FCB is or is not present. With an ideal signal, the sum 147 would result from 147 ones in the search window, if the search window is of length L=147 and is placed completely over the FCB. However, the threshold value S should be chosen to be somewhat smaller so that individual incorrect assessments do not directly lead to failure to identify an actually transmitted FCB. If the symbol sum q(k) is greater than the threshold value S $(q(k)\geq S)$, then this indicates that an FCB has been identified.

The method according to the invention for searching for pilot tones, in particular for searching for pulse trains which identify an organization channel in mobile radio systems, offers a range of advantages over the above-described prior art methods, since it is easy to implement and is insensitive to amplitude fluctuations, poor signal-to-noise ratios, and frequency mistuning.

We claim:

1. A method of identifying a pulse train with known values and a known length in a signal, which comprises the following steps:

taking successive samples of a signal and determining whether a phase difference between successive samples of the signal is in a range corresponding to a transmitted symbol "1" or in a range corresponding to a transmitted symbol "0";

filtering the symbols estimated in the determining step by placing a search window over the successively estimated symbols, the search window having a length equal to a length of a pulse train to be identified minus one, and forming a symbol sum of the estimated symbols within each search window;

comparing the symbol sum with a sum threshold value; and if the symbol sum is greater than or equal to the sum threshold value, indicating a presence of the pulse train in the signal and a temporal position of the pulse train.

2. The method according to claim 1, which comprises, prior to the determining step, phase-shifting the successive samples of the signal through an angle.

3. The method according to claim 2, which comprises phase-shifting through a phase-shift angle of $-22.5°$.

4. The method according to claim 1, wherein the pulse train to be identified is a train of 148 zeros identifying an organization channel in a mobile radio system.

5. The method according to claim 1, wherein the temporal position of the pulse train is defined as a time between an instant at which the symbol sum exceeds the sum threshold value for a first time, and an instant at which the symbol sum exceeds the threshold value for a last time.

* * * * *

UNITED STATES PATENT AND TRADEMARK OFFICE
CERTIFICATE OF CORRECTION

PATENT NO.   : 6,389,089 B1
DATED        : May 14, 2002
INVENTOR(S)  : Ralf Hartmann It is certified that error appears in the above-identified patent and that said Letters Patent is hereby corrected as shown below:

<u>Title page,</u>
Item [30], should read as follows:
-- September 30, 1997   [DE] ...................... 197 43 191.7
   October 30, 1997     [DE] ...................... 197 48 030.6 --

Signed and Sealed this

Twenty-fourth Day of September, 2002

Attest:

Attesting Officer

JAMES E. ROGAN
*Director of the United States Patent and Trademark Office*